May 5, 1953 J. B. KESSEL 2,637,824
FOOD MIXER POWER UNIT
Original Filed May 25, 1945 2 SHEETS—SHEET 1

INVENTOR.
Johannes B Kessel
BY
Atty.

May 5, 1953  J. B. KESSEL  2,637,824
FOOD MIXER POWER UNIT

Original Filed May 25, 1945  2 SHEETS—SHEET 2

INVENTOR.
Johannes B. Kessel
BY
Watson D. Harbaugh
Atty.

Patented May 5, 1953

2,637,824

UNITED STATES PATENT OFFICE 2,637,824

FOOD MIXER POWER UNIT

Johannes B. Kessel, Chicago, Ill., assignor to Dormeyer Corporation, Chicago, Ill., a corporation of Illinois Original application May 25, 1945, Serial No. 595,785. Divided and this application April 28, 1950, Serial No. 158,682

5 Claims. (Cl. 310—68)

My invention relates broadly to food mixers and more particularly to an improved electric motor power unit construction for household food mixers. This application is a division of my earlier filed application for Food Mixer Power Unit, Serial No. 595,785, filed May 25, 1945, now abandoned.

A principal objective is to provide improved cooling means for my mixer, thereby increasing not only comfort of handling and appearance but also the efficiency. Additional objectives are to provide improved speed control means for varying motor speeds and thereby the mixing speeds.

The invention utilizes a universal or series wound motor wherein speed may be controlled by varying the resistance or the number of field coil turns that are effective in the field coils in the motor circuit. Mixers of this type are customarily provided with a rheostat which makes possible the selection of an infinite number of speed ranges but is also a cause of heat and failure in many instances. The infinite variability of speeds is not recommended in the ordinary mixer because the operator, normally a housewife, becomes confused while trying to reestablish on subsequent use a speed she felt was successful on a prior use of the mixer. Therefore, instead of infinite variation, I provide variation from two to five speeds which are governed by push button controls. This not only simplifies the housewife's problems of selecting or returning to the proper speed, but also greatly increases the reliability and ease of operation, particularly when the hands of the operator are slippery as is often the case in food mixing.

For a more detailed description of my mixer, reference is made to the specifications and the drawings, in which:

Fig. 4 is a horizontal sectional view through the transmission.

Fig. 5 is a cross section of the speed control means.

Figs. 6 and 7 are schematic views of possible motor circuit hook-ups utilizing the push button control switches.

Figure 1:
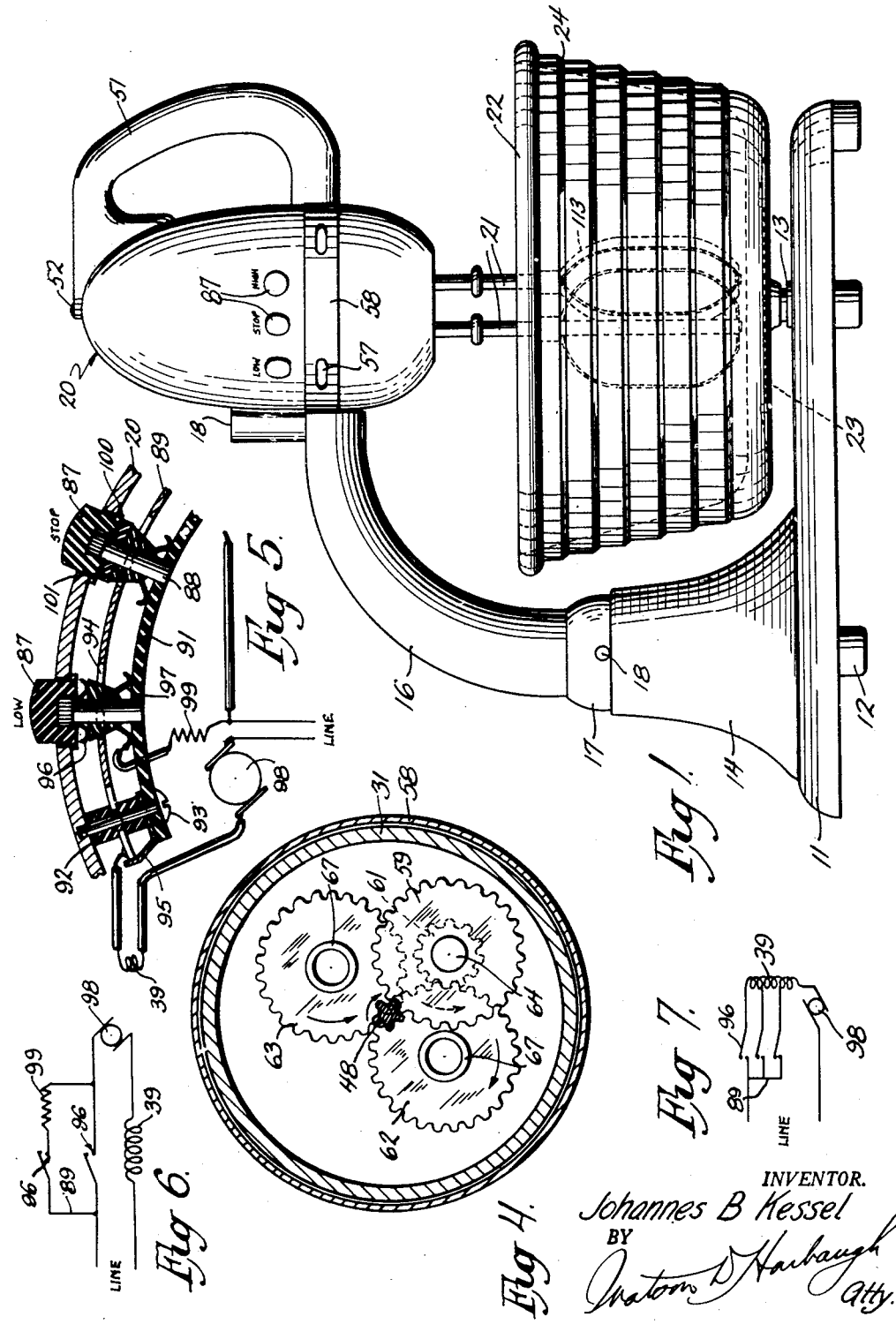
Fig. 1 is a side view of my mixer.

Referring to Fig. 1, my mixer comprises a base 11 supported by legs 12, and having a turntable bearing 13 mounted adjacent one end thereof. A pedestal 14 is attached to the other end of the base 11 and mounts a motor support arm 16 having a ball 17 and a pin 18 at its lower end adapted to be received by the pedestal 14. Means are provided within the base of the pedestal to permit and limit horizontal and vertical movement of the motor support arm 16. A vertical pin 18 is attached to the upper end of the support arm 16, which is curved through approximately 90 degrees. The pin 18 is shaped to receive a bracket 19 rigidly attached to a mixer housing generally designated 20.

The position of the mixer shown in Fig. 1 will be referred to as the normal or mixing position with beater blades 21 extending downwardly into a mixing bowl 22. A turntable 23 supports the mixing bowl 22 and is rotatably mounted in the turntable bearing 13 on the base 11. The mixing bowl 22 preferably tapers inwardly, the lip thereof being the point of maximum diameter. The tapering outer surface of the bowl is preferably provided with a series of relatively abrupt steps 24 whereby drippings, which would ordinarily tend to run down the side of the bowl, will instead drip from the edges of the steps 24 and fall to the base 11 of the mixer without continuing down the side of the bowl.

The housing 20 comprises a cup-shaped motor housing 29 having an open end and a mating transmission housing 31, each being suitably shaped internally to receive and support the motor parts and transmission elements. The motor housing 29 and the transmission housing 31 are held together at their open ends by suitable means such as through bolts not shown, thereby forming a hollow housing for the various power unit components.

A hollow handle 51 shaped to fit the hand is attached to the housing 20 at its upper end by a screw 52. The lower end 48 of the motor shaft is hobbed to mesh with the gear 59 which is formed integrally with a smaller gear 61 meshing with beater drive gear 62. A second beater drive gear 63 meshes with the gear 62 and is of the same diameter. Arrows (Fig. 4) indicate the preferred direction of rotation and the speed of the beaters 21, which is reduced from the motor speed through the gearing described, is controlled by controlling the speed of the motor.

Figure 2:
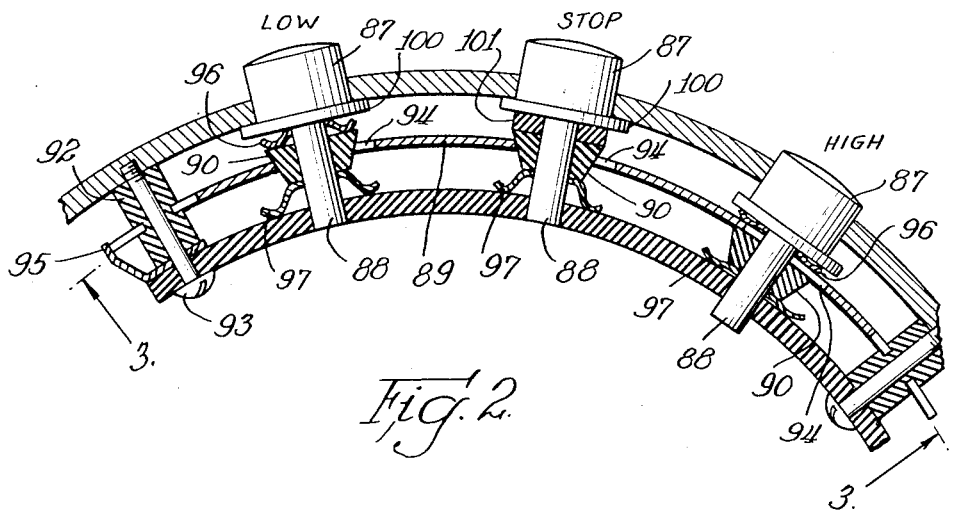
Fig. 2 is an enlarged view partly in section of the manually actuated portion of the speed control.
Figure 3:
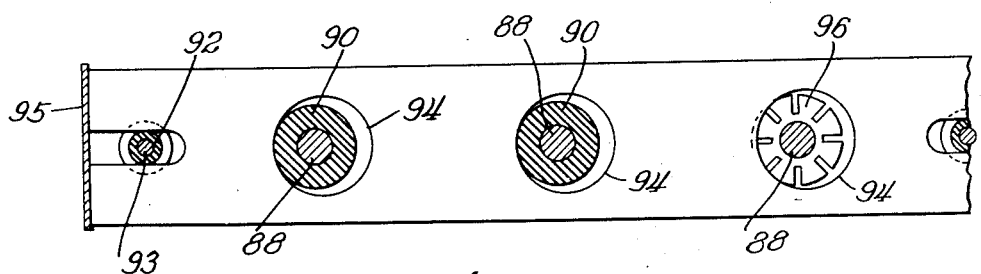
Fig. 3 is a section taken on line 3—3 of Fig. 2.

I prefer to use a universal type electric motor in my mixer wherein the speed may be controlled by increasing or decreasing the resistance or number of field turns in the motor circuit. While rheostat means are often employed for this purpose, I have found that the arrangement of switches illustrated in Figs. 2, 3 and 5 is less expensive to manufacture since substantially all of the parts can be moulded or pressed. Furthermore, reliability and ease of operation are greatly increased. In its simplest form, my controls consist of a plurality of push buttons 87 formed of an insulating material such as phenol formaldehyde resin, extending through openings in the housing 20 which serve as a guide for the buttons. Metal pins 88 extend inwardly from the push buttons 87 through a slide bar 89 and a guide bar 91, the guide bar having aligned openings adapted to receive and guide the pins 88 in their reciprocating motion. Approximately midway on the pin 88 is mounted an insulating block shaped as an inverted truncated right cone 90. The slide bar is mounted for lateral reciprocation with respect to the pins 88 on supports 92 which are formed of an insulating material such as phenol formaldehyde resin, the slide bar being of electrical conductive material such as brass. The supports may be in the form of a sleeve through which an attaching bolt 93 may extend and are grooved at approximately their mid point to receive the slide bar 89 which has formed in its end a slot adapted to fit in the slot in the supports 92. The slide bar is also provided with a series of openings indicated at 94 sufficient in size to permit the insulating cone 90 to pass downwardly through the opening. A spring 95 may be employed to force the slide bar to the right or left as may be desired, keeping one edge of the opening 94 normally against the insulating cone 90. The distances between the bottom of the push button 87 and the top of the insulating cone 90 is slightly greater than thickness of the slide bar 89. A spring washer 96 is fastened to the pin 88 adajcent the junction of the pin and push button 87. The disc 96 may be split, if desired, and extends downwardly substantially into contact with the upper surface of the insulating cone 90, the edges being turned upwardly in such manner that when the button 87 is depressed, the slide bar 89 will first be forced to the left by the action of the cone 90 and will then spring into place beneath the washer 96 and into contact with pin 88, thereby establishing electrical contact between said pin and the slide bar 89. A second spring washer 97, substantially similar in shape to spring washer 96 but usually of greater diameter, is attached firmly at its central point to the pin 88 and extends downwardly into contact with the guide plate 91 in such manner that the washer forms a spring tending always to return the push button to its outward position. The ends of the pins 88 below the guide plate may be flattened to prevent over-travel of the push button 87 or a collar 100 may be formed on the lower periphery of the push button 87. Electrical connections to the motor may be made by soldered flexible leads to the slide bar 89, which may be a common lead, and to portions of the spring washer 97. The low speed button should have in its circuit to the motor 98, Figs. 5 and 6, a resistance 99 which will reduce the motor speed. As many speeds as are deemed necessary could of course be provided by increasing the number of buttons and any desired number may be employed.

Any one of the number of buttons may be made a stop button by removing the spring washer 96 and substituting therefor an insulating washer 101 having a diameter at least equal to or greater than the maximum diameter of the insulating cone 90. When such a button is pressed, the slide bar 89 is moved to the left, disengaging the bar from spring washer 97 and breaking the previously formed circuit. No new circuit is formed, however, and the slide bar is not moved to the right while the stop button is depressed since it is blocked by the insulating washer 101. Upon release, the stop button springs upwardly again permitting the slide 89 to return to the right end action of the spring 95 and into contact with the insulating cones 90.

With this arrangement in which one lead is connected to the armature, accidental pressing of two buttons simultaneously will not cause any short circuits that will be harmful to the mixer. Furthermore the switch control arrangement fits readily and easily into the housing arcuately around the housing and if there are four or five buttons they can be staggered in a zigzag manner with the only change being in the construction of the plate 94 and sufficient of them depressed simultaneously that they are received easily in their respective openings.

Consequently, having thus described the invention and certain preferred arrangements of parts, it will be readily apparent to those skilled in the art that various and further arrangements of elements can be made without departing from the spirit of the invention the scope of which is commensurate with the claims.

What is claimed is:

1. A power unit for a food mixer comprising a housing having a circular wall portion, a motor mounted in the housing, electrical connections for driving the motor at various speeds including a plurality of switches connected in parallel with each other and in series with the motor, a plurality of buttons for operating said switches extending through the housing, a curved bar spaced from and following the contour of the wall portion and having cammable surfaces adapted to be engaged by the buttons and longitudinally displaced upon actuation of any of said buttons, and means on said bar for locking the displacing button in its bar displacing position, and further means carried by each button for releasing said bar and thereby any previously displaced button.

2. A power unit for a food mixer comprising a housing having a circular wall portion, a motor mounted in the housing, electrical connections for driving the motor at various speeds including a plurality of switches connected in parallel with each other and in series with the motor, a plurality of radially disposed push buttons biased to extend through circumferentially spaced openings in the housing and having camming means thereon, a curved bar following the contour of the wall portion, camming surfaces on said bar positioned to cooperate with said buttons whereby the bar is adapted to be displaced by actuation of any of said buttons, and means including keyways on the bar cooperating with means on the buttons for locking each displacing button in its bar displacing position, said bar being movable to one position to bring portions of its keyways into engagement with parts of said buttons for locking a major portion of the buttons in depressed position simultaneously to retard the overall radius of the buttons for installation in the housing, and means for releasing said bar and displaced buttons to ready them for operation.

3. A power unit for a food mixer comprising a housing having a circular wall portion, a motor mounted in the housing, electrical circuit connections for driving the motor at various speeds including a plurality of switches connected in parallel with each other and in series with the motor, a plurality of buttons having camming portions and extending radially through the housing, a curved bar following and concentric with the contour of the wall portion and adapted to be engaged by said camming portions and displaced longitudinally upon actuation of any of said buttons, and latching means carried by the curved bar for locking the displacing button in its bar displacing position, said bar including key ways for each button.

4. A self-contained regulating switch system for an electrically operated motor unit which comprises a casing for containing the motor unit, a series of push buttons arranged in an alignment for individual reciprocal movement within apertures of the casing, circuit controlling contacts for regulating the motor unit each associated with a related push button of said series, individual springs for urging each push button to its inactive contact releasing position, a latch bar spring loaded to engage any of said push buttons when moved into its active contact engaging position, and camming portions on each push button for shifting said bar to its unlatching condition when any button is operated, thereby releasing previously operated buttons.

5. The combination set forth in claim 4 in which said casing is a cylindrical enclosure, a guide bar having a curvature substantially concentric with the cylindrical curvature of said casing and spaced therefrom, said push buttons being confined in radial aligned openings extending through said guide bar and said casing, spacer supports between the guide bar and the casing, said latch bar being slidably supported on said spacer supports, and contacts carried by said push buttons for selectively connecting different motor control circuits by bridging said guide bar and said latch bar.

JOHANNES B. KESSEL.

References Cited in the file of this patent

UNITED STATES PATENTS

| Number | Name | Date |
|---|---|---|
| 1,319,307 | Schumacher | Oct. 21, 1919 |
| 1,449,908 | Guckin et al. | Mar. 27, 1923 |
| 1,485,158 | Babson | Feb. 6, 1924 |
| 1,704,582 | Stephenson | Mar. 5, 1929 |
| 1,754,222 | Connell | Apr. 15, 1930 |
| 1,850,191 | Wilcox | Mar. 22, 1932 |
| 1,927,626 | Calkins | Sept. 19, 1933 |
| 1,988,338 | Schmitter et al. | Jan. 15, 1935 |
| 2,027,036 | Gilbert et al. | Jan. 7, 1936 |
| 2,027,149 | Christian | Jan. 7, 1936 |
| 2,042,635 | Schellens | June 2, 1936 |
| 2,046,168 | Kinzel | June 30, 1936 |
| 2,047,288 | Phillips | July 14, 1936 |
| 2,072,551 | Forss | Mar. 2, 1937 |
| 2,101,989 | Ferbend | Dec. 14, 1937 |
| 2,103,922 | Van Guilder | Dec. 28, 1937 |
| 2,143,124 | Hall | Jan. 10, 1939 |
| 2,151,274 | Hindman | Mar. 21, 1939 |
| 2,192,845 | Bean | Mar. 5, 1940 |
| 2,323,945 | Strauss et al. | July 13, 1943 |
| 2,325,434 | Stiles | July 27, 1943 |

FOREIGN PATENTS

| Number | Country | Date |
|---|---|---|
| 831,712 | France | June 13, 1938 |

OTHER REFERENCES

"Powder Metallurgy," by Wulff, 1942.
"Powder Metallurgy," by Jones, 1937.